(12) United States Patent
Araki et al.

(10) Patent No.: US 11,664,490 B2
(45) Date of Patent: May 30, 2023

(54) POSITIVE ELECTRODE FOR LITHIUM ION BATTERY, LITHIUM ION BATTERY AND METHOD OF PRODUCING POSITIVE ELECTRODE FOR LITHIUM ION BATTERY

(71) Applicant: HONDA MOTOR CO., LTD., Tokyo (JP)

(72) Inventors: Kazuhiro Araki, Wako (JP); Taku Matsuzaka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 255 days.

(21) Appl. No.: 16/876,154

(22) Filed: May 18, 2020

(65) Prior Publication Data
US 2020/0403223 A1 Dec. 24, 2020

(30) Foreign Application Priority Data

Jun. 24, 2019 (JP) .............................. JP2019-116191

(51) Int. Cl.
*H01M 4/136* (2010.01)
*H01M 4/36* (2006.01)
(Continued)

(52) U.S. Cl.
CPC ......... *H01M 4/136* (2013.01); *H01M 4/0404* (2013.01); *H01M 4/0471* (2013.01);
(Continued)

(58) Field of Classification Search
CPC ...... H01M 4/136; H01M 4/04; H01M 4/1397; H01M 4/36; H01M 4/58
See application file for complete search history.

(56) References Cited

U.S. PATENT DOCUMENTS

| | | |
|---|---|---|
| 2010/0155656 A1 | 6/2010 | Mao et al. |
| 2014/0246619 A1* | 9/2014 | Hautier ............... H01M 4/5825 252/182.1 |
| 2020/0203765 A1* | 6/2020 | Manthiram ....... H01M 10/0569 |

FOREIGN PATENT DOCUMENTS

| | | |
|---|---|---|
| CN | 1803593 | 7/2006 |
| CN | 101320808 | 12/2008 |

(Continued)

OTHER PUBLICATIONS

Japanese Notice of Allowance for Japanese Patent Application No. 2019-116191 dated Mar. 1, 2022.

*Primary Examiner* — Kenneth J Douyette
(74) *Attorney, Agent, or Firm* — Amin, Turocy & Watson, LLP (57) ABSTRACT

A positive electrode (21) includes a positive electrode current collector (21A), and a positive electrode mixture layer (21B) which is formed on the positive electrode current collector (21A) and contains a positive electrode active material. The positive electrode mixture layer (21B) includes a first positive electrode active material (21B-1) composed of $LiVPO_4F$ and a second positive electrode active material (21B-2) composed of $LiVP_2O_7$. In addition, a mixing ratio of the first positive electrode active material (21B-1) and the second positive electrode active material (21B-2) contained in the positive electrode mixture layer (21B) is represented by $(1-x)LiVPO_4F+xLiVP_2O_7$ (x is a mass ratio, $0<x\leq0.21$).

6 Claims, 5 Drawing Sheets

(51) Int. Cl.
    *H01M 4/04*         (2006.01)
    *H01M 10/0525*    (2010.01)
    *H01M 4/1397*     (2010.01)
    *H01M 4/58*         (2010.01)
    *H01M 4/02*         (2006.01)

(52) U.S. Cl.
    CPC ......... *H01M 4/1397* (2013.01); *H01M 4/364* (2013.01); *H01M 4/5825* (2013.01); *H01M 10/0525* (2013.01); *H01M 2004/028* (2013.01)

(56) References Cited

FOREIGN PATENT DOCUMENTS

| | | |
|---|---|---|
| CN | 101651205 | 2/2010 |
| CN | 102244262 | 11/2011 |
| CN | 104577120 | 4/2015 |
| CN | 105702927 | 6/2016 |
| JP | 2002-246025 | 8/2002 |
| JP | 2012-513097 | 6/2012 |
| JP | 2013-095613 | 5/2013 |
| JP | 2014-075254 | 4/2014 |
| JP | 2014-123559 | 7/2014 |
| JP | 2015-011943 | 1/2015 |
| WO | WO-2018200631 A * | 11/2018 |

* cited by examiner

POSITIVE ELECTRODE FOR LITHIUM ION BATTERY, LITHIUM ION BATTERY AND METHOD OF PRODUCING POSITIVE ELECTRODE FOR LITHIUM ION BATTERY

CROSS-REFERENCE TO RELATED APPLICATION

Priority is claimed on Japanese Patent Application No. 2019-116191, filed Jun. 24, 2019, the content of which is incorporated herein by reference.

BACKGROUND OF THE INVENTION

Field of the Invention

The present disclosure relates to a positive electrode for a lithium ion battery, a lithium ion battery and a method of producing a positive electrode for a lithium ion battery.

Description of Related Art

In recent years, along with higher performance and more functions of electric and electronic devices, a higher energy density, a larger capacity, a higher output, improved durability, and the like have been required for lithium ion batteries that supply power to various devices. Regarding one method of realizing this, studies regarding a positive electrode active material which is a component constituting a positive electrode have been conducted.

Regarding a conventional positive electrode active material, for example, a precursor of an energy storage device material having a $VPO_4$ type crystal structure in which a composition ratio x of $PO_4$ to V is determined so that a ratio y of phosphorus (P) atoms to vanadium (V) atoms in a composition of the energy storage device material that has been synthesized using the precursor satisfies $0.85 \leq y < 1$ has been disclosed (Patent Document 1). In addition, it is said that, when the energy storage device material obtained through the precursor having a $VPO_4$ type crystal structure is used for an electrode, it is possible to improve cycle characteristics and a charging and discharging rate capability of an energy storage device.

In addition, regarding a method of producing a conventional positive electrode active material, a method of producing carbon-coated $LiVP_2O_7$ according to a solid phase method is disclosed (Patent Document 2). This production method includes a process (A) of mixing a lithium compound, a vanadium compound, and a phosphorus compound, a process (B) of preliminarily firing the mixture obtained in the process (A), a process (C) of pulverizing the preliminarily fired product after the process (B) into particles, a process (D) of mixing the pulverized product after the process (C) with carbon powder, additionally performing pulverizing and mixing using a ball mill, and coating surfaces of particles constituting the pulverized product with carbon, and a process (E) of main-firing the carbon-coated particles after the process (D) at 700 to 900° C. It is said that, when the carbon-coated $LiVP_2O_7$ obtained in this production method is used as a positive electrode active material of a lithium ion secondary battery, it is possible to improve the battery capacity.

PATENT DOCUMENTS

[Patent Document 1] Japanese Unexamined Patent Application, First Publication No. 2014-075254

[Patent Document 2] Japanese Unexamined Patent Application, First Publication No. 2013-95613

SUMMARY OF THE INVENTION

However, in the technology of Patent Document 1, since an energy storage device material used for an electrode is single-phase $LiVPO_4F$, the voltage increases due to the IR drop at the end of charging, the regenerative energy may not be sufficiently absorbed, and the charging acceptability of the battery is insufficient.

In addition, in the technology of Patent Document 2, since the discharging capacity of $LiVP_2O_7$ is 100 mAh/g, which is smaller than that of $LiVPO_4F$, battery characteristics significantly deteriorate in the $LiVP_2O_7$ single phase.

An object of the present disclosure is to provide a positive electrode for a lithium ion battery, a lithium ion battery, and a method of producing a positive electrode for a lithium ion battery through which it is possible to improve charging acceptability of a battery and realize excellent battery characteristics.

The inventors conducted extensive studies, and as a result, found that, when a positive electrode mixture in which $LiVPO_4F$ that can realize a high operating voltage and a large discharging capacity and $LiVP_2O_7$ having a potential of about 50 mV higher than $LiVPO_4F$ are mixed at a specific mass ratio is used, it is possible to greatly improve charging acceptability while significantly minimizing a decrease in the discharging capacity of a lithium ion battery, and realize excellent battery characteristics.

That is, the present disclosure provides the following aspects.

[1] A positive electrode for a lithium ion battery, including: a positive electrode current collector and a positive electrode mixture layer formed on the positive electrode current collector, wherein the positive electrode mixture layer contains a first positive electrode active material composed of $LiVPO_4F$ and a second positive electrode active material composed of $LiVP_2O_7$, and wherein a mixing ratio of the first positive electrode active material and the second positive electrode active material contained in the positive electrode mixture layer is represented by $(1-x)LiVPO_4F + xLiVP_2O_7$ (x is a mass ratio, $0 < x \leq 0.21$).

[2] The positive electrode for a lithium ion battery according to the above-described [1], wherein the mass ratio satisfies $0.03 \leq x \leq 0.21$.

[3] The positive electrode for a lithium ion battery according to the above-described [1], wherein the mixing ratio of the first positive electrode active material and the second positive electrode active material in the positive electrode mixture layer is determined by Rietveld analysis of XRD patterns.

[4] The positive electrode for a lithium ion battery according to the above-described [2], wherein the mixing ratio of the first positive electrode active material and the second positive electrode active material in the positive electrode mixture layer is determined by Rietveld analysis of XRD patterns.

[5] A lithium ion battery comprising the positive electrode for a lithium ion battery according to the above-described [1].

[6] A method of producing a positive electrode for a lithium ion battery, including forming a positive electrode mixture layer containing a first positive electrode active material and a second positive electrode active material on a positive electrode current collector so that a mixing ratio of the first positive electrode active material composed of $LiVPO_4F$ and the second positive electrode active material composed of $LiVP_2O_7$ is represented by $(1-x)LiVPO_4F+xLiVP_2O_7$ (x is a mass ratio, $0<x\leq0.21$).

[7] The method of producing a positive electrode for a lithium ion battery according to the above-described [6], wherein the positive electrode mixture layer is formed on the positive electrode current collector so that the mass ratio satisfies $0.03\leq x\leq0.21$.

[8] The method of producing a positive electrode for a lithium ion battery according to the above-described [6], wherein the mixing ratio of the first positive electrode active material and the second positive electrode active material in the positive electrode mixture layer is determined by Rietveld analysis of XRD patterns.

[9] The method of producing a positive electrode for a lithium ion battery according to the above-described [7], wherein the mixing ratio of the first positive electrode active material and the second positive electrode active material in the positive electrode mixture layer is determined by Rietveld analysis of XRD patterns.

[10] The method of producing a positive electrode for a lithium ion battery according to the above-described [6], including: a mixing process in which LiF, PTFE, stearic acid, a vanadium compound and an ammonium phosphate compound are mixed; a drying process in which the mixture obtained in the mixing process is dried; a pulverizing process in which the dried product obtained in the drying process is pulverized; and a firing process in which the pulverized product obtained in the pulverizing process is fired to obtain a positive electrode active material composed of the first positive electrode active material and the second positive electrode active material.

[11] The method of producing a positive electrode for a lithium ion battery according to the above-described [6], including: a mixing process (A) in which LiF, PTFE, stearic acid, vanadium oxide having a particle size distribution of less than 200 μm and an ammonium phosphate compound are mixed; a drying process (B) in which the mixture obtained in the mixing process (A) is dried; a pulverizing process (C) in which the dried product obtained in the drying process (B) is pulverized 120 times over 30 seconds; a firing process (D) in which the pulverized product obtained in the pulverizing process (C) is fired to obtain the first positive electrode active material; a mixing process (E) in which citric acid and phosphoric acid are mixed into a solution in which vanadium oxide is dissolved; a drying process (F) in which the mixture obtained in the mixing process (E) is dried; a firing process (G) in which the dried product obtained in the drying process (F) is fired; a pulverizing process (H) in which lithium carbonate and citric acid are added to the fired product obtained in the firing process (G) and the mixture is pulverized and mixed; a pre-firing process (I) in which the pulverized product obtained in the pulverizing process (H) is pre-fired; a main firing process (J) in which the fired product obtained in the pre-firing process (I) is main-fired to obtain a second positive electrode active material; and a mixing process (K) in which the first positive electrode active material and the second positive electrode active material are mixed at the mixing ratio to obtain a positive electrode active material composed of the first positive electrode active material and the second positive electrode active material.

According to the present disclosure, it is possible to improve charging acceptability of a battery and realize excellent battery characteristics.

DETAILED DESCRIPTION OF THE INVENTION

Hereinafter, embodiments of the present disclosure will be described in detail with reference to the drawings.

[Configuration of Positive Electrode for Lithium Ion Battery and Lithium Ion Battery]

Figure 1:
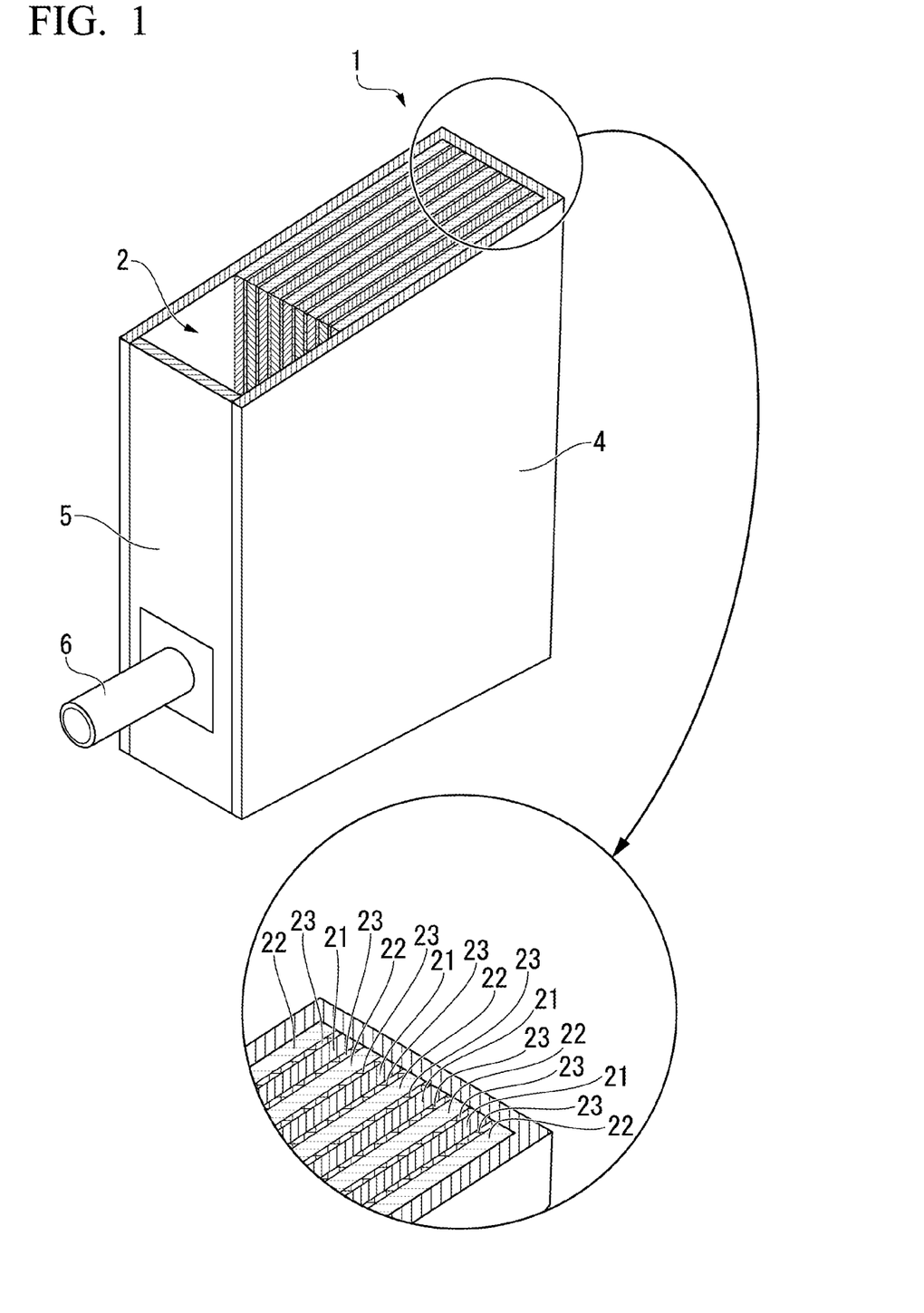
FIG. 1 is a perspective view showing an overall configuration of a lithium ion battery according to an embodiment of the present disclosure.
Figure 2A:
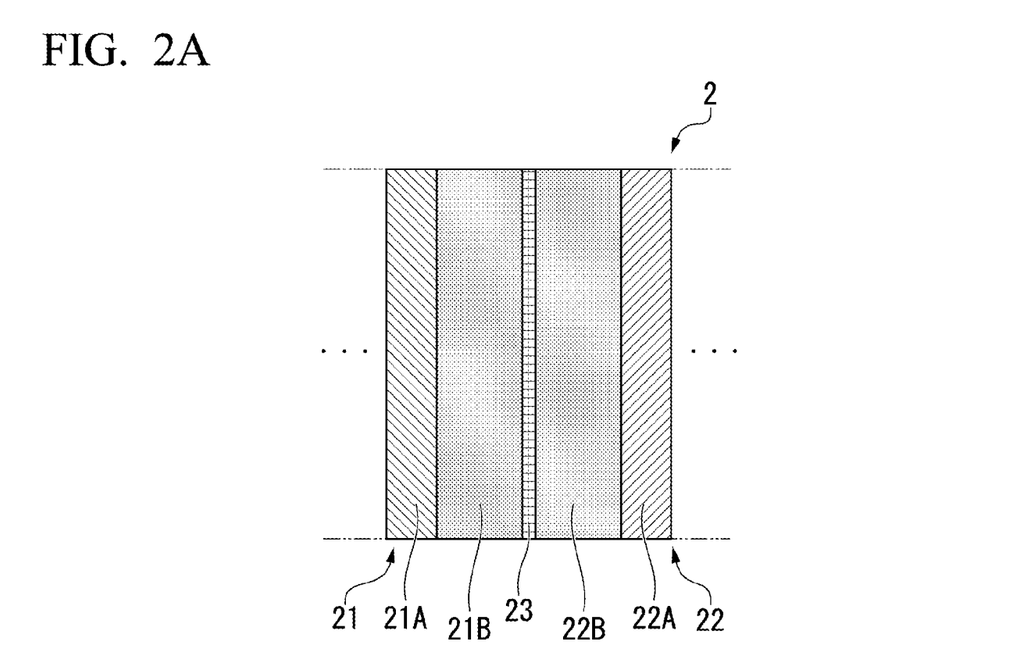
FIG. 2A is a partial cross-sectional view schematically showing an internal configuration of the lithium ion battery in FIG. 1.

FIG. 1 is a perspective view showing an overall configuration of a lithium ion battery according to an embodiment of the present disclosure. FIG. 2A is a partial cross-sectional view schematically showing an internal configuration of the lithium ion battery in FIG. 1. Here, in the drawings used in the following description, in order to facilitate understanding of features, feature parts are enlarged for convenience of illustration in some cases, and the shapes, size ratios, and the like of components are not limited to those shown.

As shown in FIG. 1, a lithium ion battery 1 includes a laminate 2 including electrodes, an exterior body 4 in which the laminate is accommodated, and a lid 5 that seals the exterior body 4. The lithium ion battery 1 is, for example, a square lithium ion secondary battery. The exterior body 4 is formed of, for example, a metallic housing.

Figure 2B:
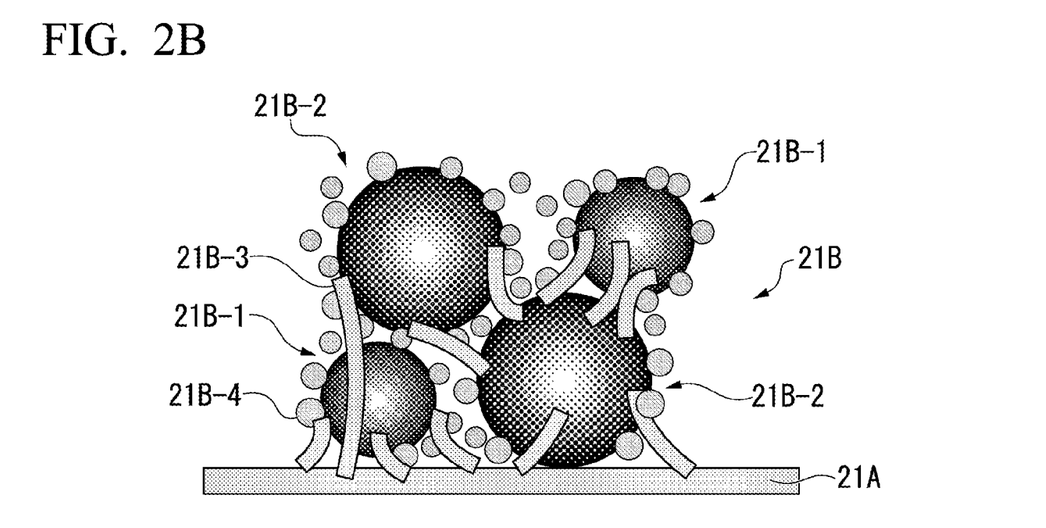
FIG. 2B is a partially enlarged cross-sectional view schematically showing a configuration of a positive electrode for a lithium ion battery in FIG. 2A.

As shown in FIG. 2A and FIG. 2B, the laminate 2 includes a positive electrode 21 for a lithium ion battery (hereinafter simply referred to as a positive electrode), a negative electrode 22 for a lithium ion battery (hereinafter simply referred to as a negative electrode), and a separator 23 interposed between the positive electrode 21 and the negative electrode 22. The positive electrode 21, the negative electrode 22, and the separator are impregnated with an electrolytic solution. A positive electrode current collector 21A is connected to a positive electrode current collecting part (not shown), and a negative electrode current collector 22A is connected to a negative electrode current collecting part (not shown).

The positive electrode 21 includes the positive electrode current collector 21A and a positive electrode mixture layer 21B which is formed on the positive electrode current collector 21A and contains a positive electrode active material.

The positive electrode current collector 21A is, for example, a plate or film formed of a conductive material. Regarding the conductive material, for example, a metal such as aluminum (Al) or nickel (Ni) can be used. When the conductive material is aluminum (Al), an Al—Fe alloy such as JIS A8021 or pure aluminum such as JIS A1085 can be used. The thickness of the positive electrode current collector 21A is, for example, 8 μm or more and 15 μm or less.

The positive electrode mixture layer 21B includes a first positive electrode active material 21B-1 composed of LiVPO$_4$F and a second positive electrode active material 21B-2 composed of LiVP$_2$O$_7$. Then, a mixing ratio of the first positive electrode active material 21B-1 and the second positive electrode active material 21B-2 contained in the positive electrode mixture layer 21B is represented by (1−x)LiVPO$_4$F+xLiVP$_2$O$_7$ (x is a mass ratio, 0<x≤0.21). That is, the positive electrode active material of the present embodiment is composed of a lithium-vanadium phosphate composite in which LiVPO$_4$F and LiVP$_2$O$_7$ are mixed at a predetermined mixing ratio. When the mass ratio of the second positive electrode active material 21B-2 exceeds 0, charging acceptability at a high state of charge (SOC) is improved, and a longer lifespan can be realized. On the other hand, when the mass ratio of the second positive electrode active material 21B-2 is 0.21 or less, it is possible to obtain the effects of charging acceptability and a longer lifespan without significantly reducing the discharging capacity.

In addition, it is preferable that the mass ratio satisfy 0.03≤x≤0.21. When the mass ratio of the second positive electrode active material 21B-2 is 0.03 or more, it is possible to further improve charging acceptability at a high SOC.

Figure 3A:
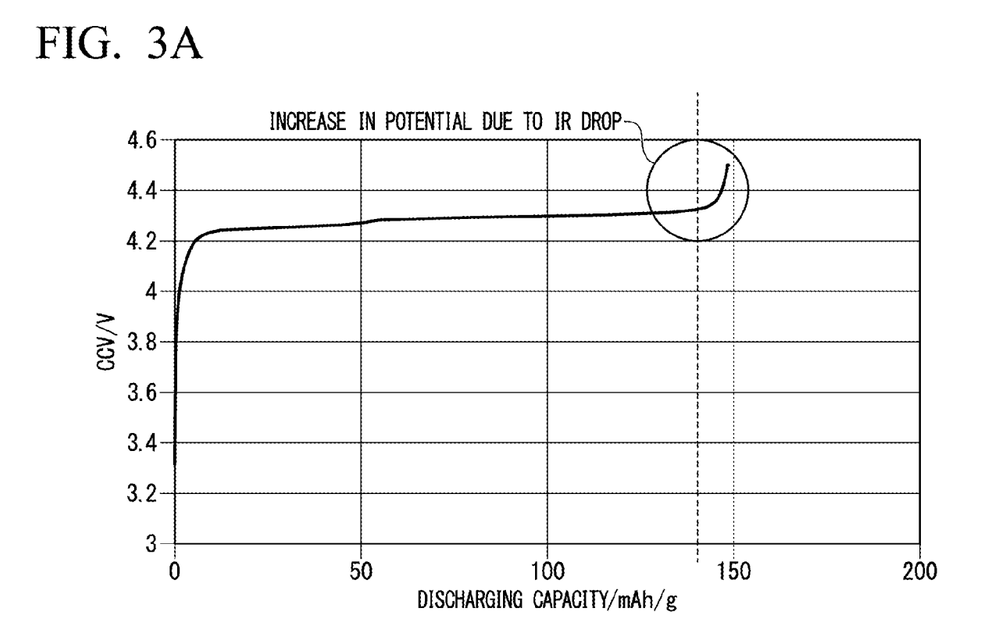
FIG. 3A is a graph showing an example of a charging curve when no second positive electrode active material is mixed in (x=0)
Figure 3B:
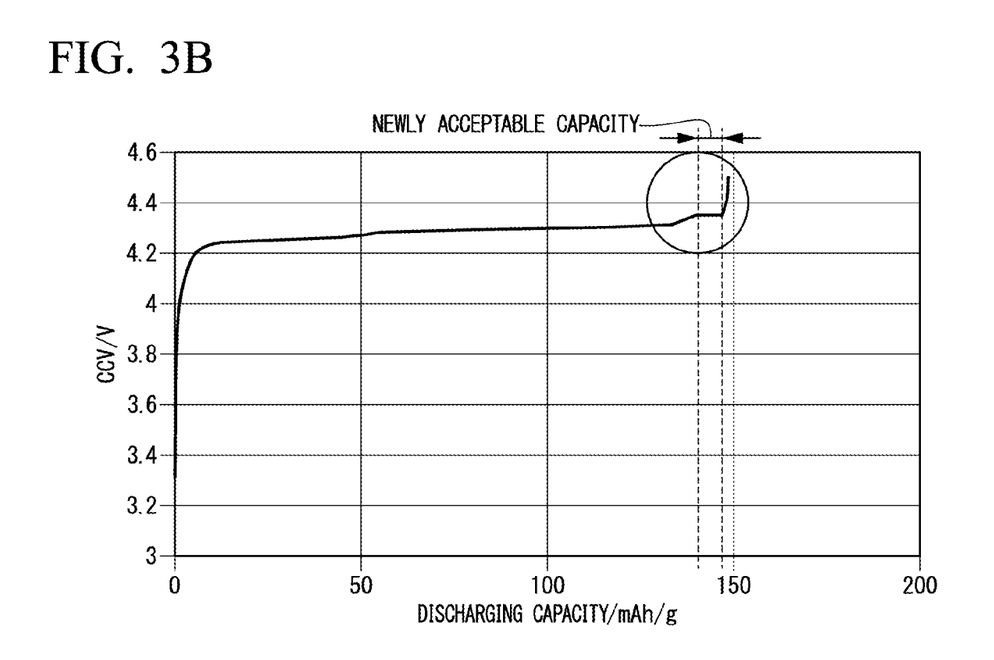
FIG. 3B is a graph showing an example of a charging curve when a mixing ratio of the second positive electrode active material is x=0.04.

FIG. 3A is a graph showing an example of a charging curve when no second positive electrode active material is mixed in (x=0), and FIG. 3B is a graph showing an example of a charging curve when the mixing ratio of the second positive electrode active material is x=0.04. Charging conditions in FIG. 3A and FIG. 3B are the same, and are the same as when a discharging capacity is measured at a 0.2 C rate in examples to be described below.

As shown in FIG. 3A when no second positive electrode active material is mixed in, an increase in the potential due to the IR drop is observed around a discharging capacity of 140 mAh (within a frame in the drawing). On the other hand, in the present embodiment, LiVP$_2$O$_7$ whose charging potential on the charging side is about 50 mV higher than LiVPO$_4$F (first positive electrode active material) is mixed in as the second positive electrode active material at the mixing ratio, and a crystal structure of the first positive electrode active material and a crystal structure of the second positive electrode active material are made to coexist. It can be understood that, when the second positive electrode active material is mixed in, as shown in FIG. 3B, the charging capacity increases from around 140 mAh/g to around 147 mAh/g, and a newly acceptable charging region is obtained (within a frame in the drawing).

Figure 4:
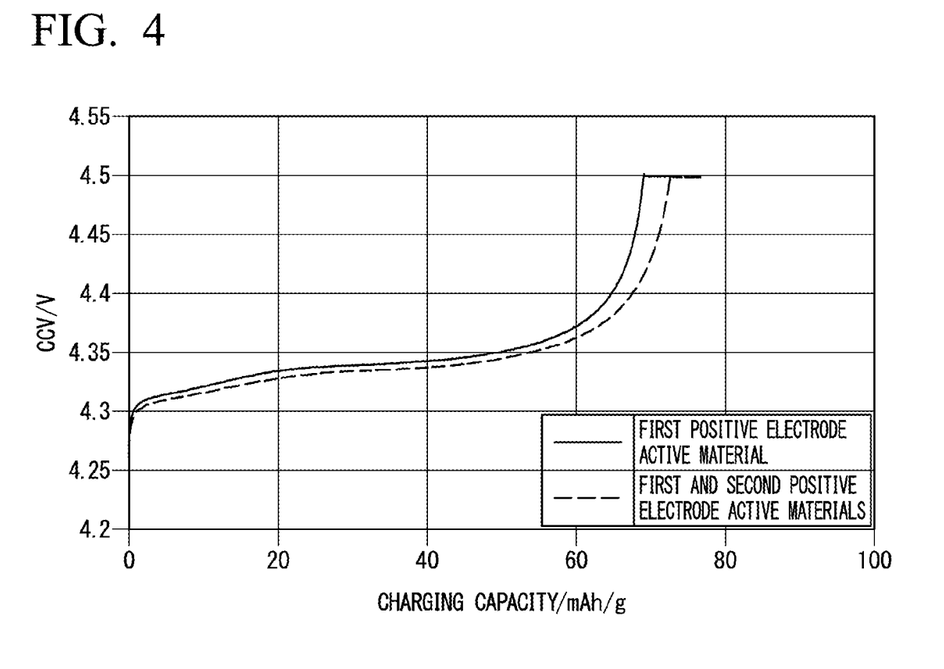
FIG. 4 is a graph showing charging curves when charging is performed at a 5 C rate when no second positive electrode active material is mixed in (x=0) and when a mixing ratio of the second positive electrode active material is x=0.04.

FIG. 4 is a graph showing charging curves when charging is performed at a 5 C rate when no second positive electrode active material is mixed in (x=0) and when a mixing ratio of the second positive electrode active material is x=0.04. As shown in FIG. 4, it can be understood that, when charging is performed at a 5 C rate, the step near at the end of charging as shown in FIG. 3B disappears, but the charging capacity is increased by about 5 mAh/g compared to when no second positive electrode active material is mixed in (FIG. 3B). In this manner, in the present embodiment, when the charging region is increased compared to a positive electrode active material (single phase) composed of only the first positive electrode active material LiVPO$_4$F, the charging capacity in high rate charging increases, and as a result, charging acceptability at a high SOC is improved. In addition, it is possible to prevent charge consumption from being used for decomposing the electrolytic solution, which contributes to a longer lifespan.

A mixing ratio of the first positive electrode active material 21B-1 and the second positive electrode active material 21B-2 in the positive electrode mixture layer 21B may be determined by Rietveld analysis of XRD patterns. In the Rietveld analysis, for example, an XRD pattern obtained by an X-ray powder diffraction experiment is fitted using a least squares method.

When LiVPO$_4$F and LiVP$_2$O$_7$ are individually synthesized, and then mixed to obtain a positive electrode mixture layer, a mixing ratio of the positive electrode mixture layer 21B as a final product can be determined according to amounts of LiVPO$_4$F and LiVP$_2$O$_7$ prepared. However, when LiF, V$_2$O$_5$ and NH$_4$H$_2$PO$_4$ are mixed, and LiVPO$_4$F and LiVP$_2$O$_7$ are synthesized together to obtain a positive electrode mixture layer, it is not possible to determine a mixing ratio thereof. When Rietveld analysis of XRD patterns is used, it is possible to determine the mixing ratio regardless of a method of producing a positive electrode mixture layer.

Regarding a conductive agent 21B-3, for example, a carbon material can be used. Regarding the carbon material, one or two or more selected from the group consisting of acetylene black, carbon nanotubes, graphene and graphite particles can be used. Regarding the carbon nanotubes, for example, VGCF synthesized by a gas phase method (CVD) can be used.

Regarding a binder 21B-4, for example, polyvinylidene fluoride (PVDF) can be used.

For example, the negative electrode 22 includes the negative electrode current collector 22A, and a negative electrode mixture layer 22B which is formed on the negative electrode current collector 22A and contains a negative electrode active material.

Like the positive electrode current collector 21A, the negative electrode current collector 22A is, for example, a plate or film formed of a conductive material. Regarding the conductive material, for example, a metal such as copper (Cu) or nickel (Ni) can be used. When the conductive material is copper, for example, tough pitch copper such as JIS C1100 can be used. The thickness of the negative electrode current collector 22A is, for example, 5 μm or more and 10 μm or less.

The negative electrode active material is not particularly limited, and for example, can include one or more selected from the group consisting of natural graphite, artificial graphite, hard carbon, activated carbon, silicon (Si), silicon oxide (SiOx), tin (Sn) and tin oxide (SnOx).

Regarding the binder of the negative electrode mixture layer 22B, for example, one or two or more selected from the group consisting of polyvinylidene fluoride (PVDF), styrene butadiene rubber (SBR) and carboxymethyl cellulose (CMC) can be used. In addition, regarding the conductive agent of the negative electrode mixture layer 22B, for example, one or both of acetylene black and carbon nanotubes can be used. Regarding the carbon nanotubes, for example, VGCF synthesized by a gas phase method (CVD) can be used.

The negative electrode mixture layer 22B may include a binder, a conductive agent, a thickener and the like (not shown). In this case, the mixing ratio of the mixture in the negative electrode mixture layer 22B can be, for example (negative electrode active material):(conductive agent):(binder):(thickener)=96 to 98:0 to 1:1 to 2:0.5 to 1.

A positive electrode current collecting part electrically connects a plurality of positive electrode current collectors 21A to a positive electrode terminal 6. The positive electrode current collecting part is made of, for example, aluminum (Al) or an aluminum alloy.

The negative electrode current collecting part electrically connects a plurality of negative electrode current collectors 22A to a negative electrode terminal (not shown). The negative electrode current collecting part is made of, for example, copper (Cu) or a copper alloy.

The lithium ion battery 1 is of a square type, but is not limited thereto, and may be of a laminate cell type or a cylindrical type. In addition, the exterior body 4 of the lithium ion battery 1 is, for example, a metal housing, but is not limited thereto, and the exterior body may be a laminate film.

When the exterior body of the lithium ion battery 1 is a laminate film, the laminate film can includes a base material, a protective layer, and an adhesive layer.

The base material is made of, for example, aluminum (Al) or stainless steel such as SUS. The protective layer is composed of, for example, one or two or more selected from the group consisting of polyethylene terephthalate (PET), polyether sulfone (PES) and nylon. The adhesive layer is formed of, for example, a polyolefin resin. Regarding the polyolefin resin, for example, any of maleic anhydride-modified polyethylene and polypropylene (PP) can be used.

In addition, when the exterior body of the lithium ion battery 1 is a laminate film, it can include a positive electrode tab lead that connects the positive electrode current collector to an external electrode and a negative electrode tab lead that connects the negative electrode current collector and an external electrode.

The positive electrode tab lead includes, for example, a positive electrode metal plate and a positive electrode tab film which is externally fitted to the positive electrode metal plate. The positive electrode metal plate is made of, for example, aluminum (Al). In addition, a coating made of an organic material or inorganic material may be provided on the surface of the positive electrode metal plate. The positive electrode tab film is formed of, for example, a polyolefin resin. Regarding the polyolefin resin, any of polyethylene, polypropylene, an ionomer resin and a modified polyolefin resin can be used.

The negative electrode tab lead includes, for example, a negative electrode metal plate and a negative electrode tab film that is externally fitted to the negative electrode metal plate. The negative electrode metal plate is, for example, copper (Cu), copper (Cu) plated with nickel (Ni), or a copper (Cu)-nickel (Ni) clad material. In addition, a coating made of an organic material or inorganic material may be provided on the surface of the negative electrode metal plate. The negative electrode tab film is, for example, formed of a polyolefin resin. Regarding the polyolefin resin, any of polyethylene, polypropylene, an ionomer resin and a modified polyolefin resin can be used.

The separator 23 is an insulating thin film, for example, a porous body made of a material such as a polyethylene resin, a polypropylene resin or an aramid resin. In addition, the separator 23 may include a porous body and a coating layer formed on the surface of the porous body. Regarding the coating layer, for example, a ceramic composed of silicon oxide (SiOx), aluminum oxide ($Al_2O_3$) or the like or an aramid resin can be used.

The electrolytic solution can include, for example, a solvent, a lithium salt, and an additive.

Regarding the solvent, for example, one or two or more selected from the group consisting of ethylene carbonate (EC), propylene carbonate (PC), dimethyl carbonate (DMC), ethyl methyl carbonate (EMC), diethyl carbonate (DEC) and γ-butyrolactone (γBL) can be used.

Regarding the lithium salt, for example, one or two or more selected from the group consisting of $LiPF_6$, lithium bis(fluorosulfonyl)imide (LiFSI), lithium bis(trifluoromethanesulfonyl)imide (LiTFSI), lithium bis(oxalate)borate (LiBOB), lithium difluorophosphate (LiDFP) and lithium difluoro(oxalate)borate (LiDFOB) can be used.

Regarding the additive, for example, one or two or more selected from the group consisting of vinylene carbonate (VC), fluoroethylene carbonate (FEC), propane sultone (PS) and propene sultone (PRS) can be used.

[Method of Producing Positive Electrode for Lithium Ion Battery]

A positive electrode for a lithium ion battery configured as described above is produced by forming a positive electrode mixture layer containing a first positive electrode active material and a second positive electrode active material on a positive electrode current collector so that a mixing ratio of the first positive electrode active material composed of $LiVPO_4F$ and the second positive electrode active material composed of $LiVP_2O_7$ is represented by $(1-x)LiVPO_4F + xLiVP_2O_7$ (x is a mass ratio, $0 < x \leq 0.21$).

First, a method of producing a positive electrode active material constituting a positive electrode mixture layer will be described.

The method of producing a positive electrode active material includes a mixing process, a drying process, a pulverizing process, and a firing process. However, other processes may be added as long as the mixing ratio of the first positive electrode active material and the second positive electrode active material in the positive electrode active material is not affected.

(Mixing Process)

LiF, PTFE, stearic acid, a vanadium compound and an ammonium phosphate compound are mixed. The mixing is not particularly limited, and for example, it can be performed using a planetary ball mill. The vanadium compound is not particularly limited, and vanadium pentoxide ($V_2O_5$) is preferably used. The ammonium phosphate compound is not particularly limited, and ammonium dihydrogen phosphate ($NH_4H_2PO_4$) is preferably used. In addition, a solvent such as hexane may be additionally mixed with LiF, PTFE, stearic acid, a vanadium compound and an ammonium phosphate compound.

(Drying Process)

Next, the mixture obtained in the mixing process is dried. Drying can be performed using, for example, an oven. The drying temperature is not particularly limited, and is, for example, 50° C. or higher and 70° C. or lower.

(Pulverizing Process)

Then, the dried product obtained in the drying process is pulverized. The pulverization is not particularly limited, and for example, it can be performed using a pulverizing machine. When the first positive electrode active material and the second positive electrode active material are synthesized together to obtain a positive electrode active material, the mixing ratio of the first positive electrode active material and the second positive electrode active material is controlled according a cumulative time of pulverization and mixing (the product of the time and the number of times of pulverization and mixing). In the present embodiment, when a heterogeneous reaction environment of a Li source is created in the pulverizing process, $LiVP_2O_7$ is generated as by-products. Then, when the heterogeneous reaction environment of a Li source is changed, it is possible to adjust the mixing ratio of the first positive electrode active material and the second positive electrode active material. In this case, it is preferable to adjust the mixing ratio of the first positive electrode active material and the second positive electrode active material so that the mass ratio satisfies $0.03 \leq x \leq 0.21$. Thereby, the positive electrode mixture layer having the mixing ratio can be formed on the positive electrode current collector.

(Firing Process)

Next, the pulverized product obtained in the pulverizing process is fired to obtain a positive electrode active material composed of the first positive electrode active material ($LiVPO_4F$) and the second positive electrode active material ($LiVP_2O_7$). The firing is not particularly limited, but is preferably performed under an inert atmosphere such as argon. In addition, the firing temperature is, for example, at 600° C. or higher and 800° C. or lower, and the heating rate is, for example, 2° C./min or more and 10° C./min or less.

In the above embodiment, the first positive electrode active material and the second positive electrode active material are synthesized together to obtain a positive electrode active material, but the present disclosure is not limited thereto. The synthesis of the first positive electrode active material and the synthesis of the second positive electrode active material are individually performed, and the obtained first positive electrode active material (single phase) and second positive electrode active material (single phase) may be mixed to obtain a positive electrode active material (plurality of phases).

The first positive electrode active material is synthesized alone, for example, by the same production method as in Comparative Example 1 to be described below. LiF, PTFE, stearic acid, vanadium oxide having a particle size distribution of less than 200 μm (for example, $V_2O_5$), and an ammonium phosphate compound are mixed together (mixing process (A)). Next, the obtained mixture is dried (drying process (B)), the obtained dried product is pulverized 120 times over 30 seconds (pulverizing process (C)), and the obtained pulverized product is fired (firing process (D)) to obtain the first positive electrode active material ($LiVPO_4F$).

The second positive electrode active material is synthesized alone, for example, by the following production method. First, a solution in which vanadium oxide is dissolved (for example, $V_2O_5+H_2O_2$) is mixed with citric acid and phosphoric acid (mixing process (E)). The obtained mixture is dried (drying process (F)), the obtained dried product is fired (firing process (G)), and lithium carbonate and citric acid (as necessary, distilled water) are added to the obtained fired product, and the mixture is pulverized and mixed using a ball mill (pulverizing process (H)). Then, the obtained pulverized product is pre-fired at 350° C. for 4 hours (pre-firing process (I)), and additionally, is main-fired at 750° C. for 8 hours (main firing process (J)) to obtain the second positive electrode active material ($LiVP_2O_7$).

Then, the first positive electrode active material and the second positive electrode active material are mixed at the mixing ratio, and thereby a positive electrode active material composed of the first positive electrode active material and the second positive electrode active material can be obtained.

Then, the positive electrode mixture slurry is applied to the positive electrode current collector composed of aluminum (Al) or the like (coating process), and a positive electrode for a lithium ion battery in which the positive electrode mixture layer is formed on the positive electrode current collector is obtained through the drying process and the rolling process.

While embodiments of the present disclosure have been described above in detail, the present disclosure is not limited to the embodiment, and various modifications and alternations can be made in a range within the spirit and scope of the present disclosure described in the scope of the claims.

EXAMPLES

Examples of the present disclosure will be described below. However, the present disclosure is not limited to the following examples.

Example 1

2.37 g of LiF, 7.94 g of $V_2O_5$, 10.4 g of $NH_4H_2PO_4$, 1.02 g of stearic acid, and 7.5 mL of hexane were put into a zirconia pot, and mixed using a planetary ball mill (device name "Planetary Ball Mill Classic Line" commercially available from Fritsch Japan Co., Ltd.) at 150 rpm for 9 minutes. Then, 6.11 g of PTFE was added to the obtained mixture, and the mixture was additionally mixed at 400 rpm for 9 minutes. Next, the mixture was dried in an oven at 60° C. for 3 hours. Next, the obtained dried product was pulverized using a pulverizing machine 10 times over 30 second, the obtained pulverized product was fired in an Ar airflow at 650° C. for 1 hour at a heating rate of 5° C./min, and thereby a positive electrode active material composed of $LiVPO_4F$ and $LiVP_2O_7$ was obtained.

Next, 85 mass % of the obtained positive electrode active material, 10 mass % of a carbon material as a conductive agent, and 5 mass % of a PVDF binder as a binding agent were mixed to prepare a positive electrode mixture slurry, and the slurry was applied to an aluminum foil made of A8021 and with a thickness of 15 μm. The amount of the positive electrode mixture slurry applied was 21.2 mg/cm². Then, drying and rolling were performed to obtain a positive electrode. The size of the positive electrode was 40 mm×40 mm.

In addition, 97 mass % of natural graphite, 1 mass % of a carbon material as a conductive aid, 1 mass % of SBR as a binder, and 1 mass % of CMC as a thickener were mixed to prepare a negative electrode mixture slurry, and the slurry was applied to a rolled copper foil made of tough pitch copper (JIS C1100) and with a thickness of 6 μm. The amount of the negative electrode mixture slurry applied was 12.3 mg/cm². Then, drying and rolling were performed to obtain a negative electrode. The size of the negative electrode was 44 mm×44 mm.

Next, the positive electrode and negative electrode obtained above and a porous separator made of polyolefin were prepared, and the positive electrode, the porous separator, and the negative electrode were laminated in that order to form a laminate. Next, the laminate was accommodated in the exterior body, and the positive electrode current collecting part and the negative electrode current collecting part were connected to the positive electrode terminal and the negative electrode terminal, respectively. Then, 1.2 M $LiPF_6$ was mixed with EC: 30 wt %, EMC: 40 wt %, and DMC: 30 wt % to prepare an electrolytic solution, the electrolytic solution was filled into the exterior body, and the exterior body was sealed with a lid to obtain a lithium ion battery.

Example 2

A positive electrode active material and a lithium ion battery were obtained in the same manner as in Example 1 except that the dried product was pulverized 30 times over 30 seconds. In Example 2, the mixing ratio of LiVPO$_4$F and LiVP$_2$O$_7$ was adjusted by increasing a cumulative time of pulverization and mixing in the pulverizing process as compared with Example 1.

Example 3

A positive electrode active material and a lithium ion battery were obtained in the same manner as in Example 2 except that V$_2$O$_5$ having a particle size distribution of less than 300 μm was used. In Example 3, the mixing ratio of LiVPO$_4$F and LiVP$_2$O$_7$ was adjusted by decreasing a particle size distribution as compared with Example 2.

Comparative Example 1

A positive electrode active material and a lithium ion battery were obtained in the same manner as in Example 3 except that V$_2$O$_5$ having a particle size distribution of less than 200 μm was used and the dried product was pulverized 120 times over 30 seconds. In Comparative Example 1, the particle size distribution of V$_2$O$_5$ was made smaller than that of Example 3 and a cumulative time of pulverization and mixing was made longer than that of Example 3, and thereby a positive electrode active material composed of only LiVPO$_4$F was obtained.

Next, the obtained lithium ion battery was measured and evaluated according to the following method.

[Measurement of Mixing Ratio]

Figure 5:
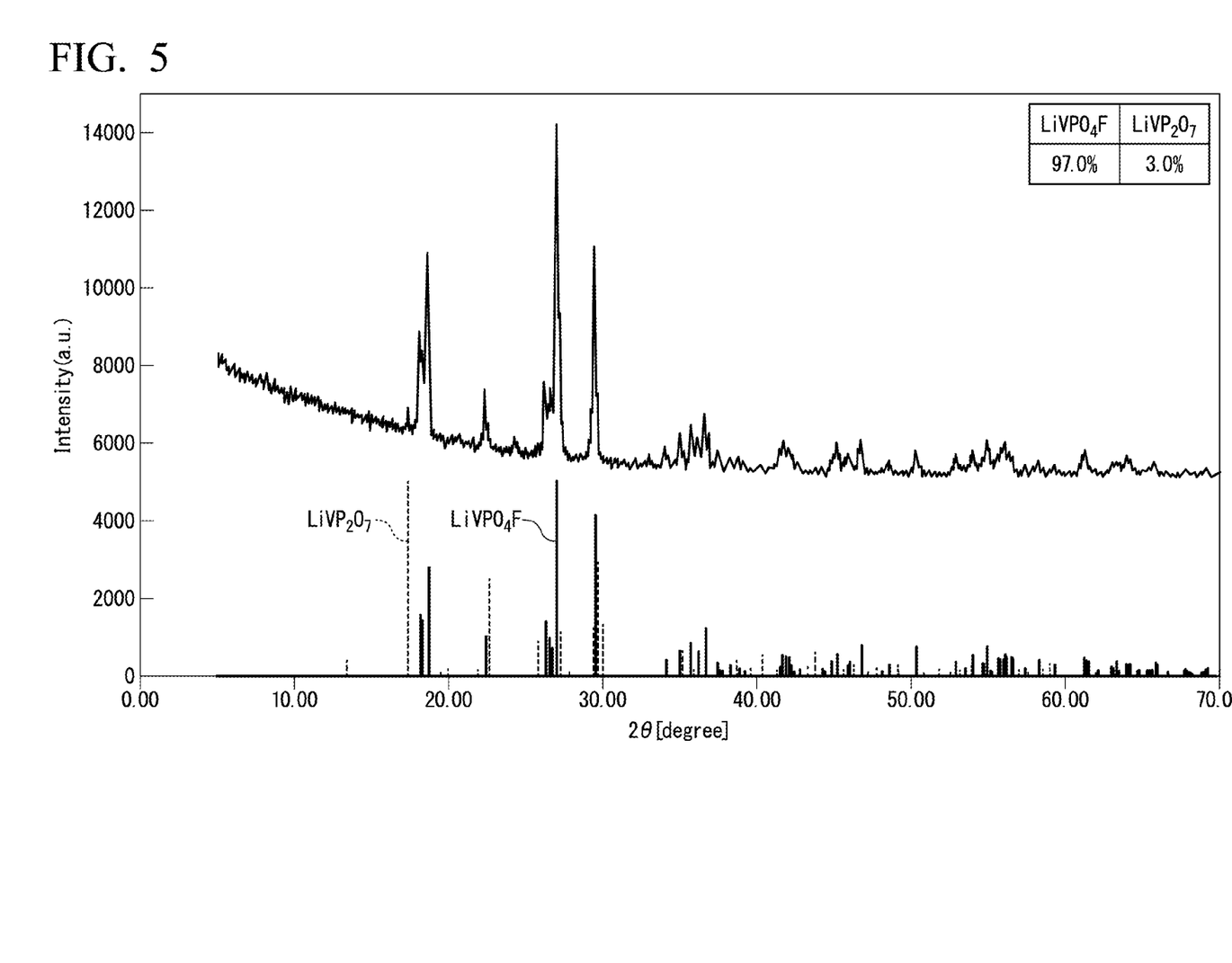
FIG. 5 is a graph showing XRD patterns when a mixing ratio of a first positive electrode active material and a second positive electrode active material in Example 3 is measured.

An XRD pattern of the positive electrode active material was measured using an X-ray powder diffractometer (device name "automated multipurpose X-ray diffractometer" commercially available from Rigaku Corporation), the XRD pattern was fitted using a least squares method, and the mixing ratio (mass ratio) of LiVPO$_4$F and LiVP$_2$O$_7$ constituting the positive electrode active material was measured. As an example of the XRD pattern, an XRD pattern when the mixing ratio of LiVPO$_4$F and LiVP$_2$O$_7$ in Example 3 was measured is shown in FIG. 5.

[Charging Rate Characteristics]

In 0.2 C charging, an environmental temperature was 25° C., charging conditions were 0.2 C, CC, 4.4 V cut off, rest for 10 minutes, and discharging conditions were 0.2 C, CC, 3 V cut off, rest for 10 minutes. In addition, in 5 C charging, an environmental temperature was 25° C., charging conditions were 5 C, CC, 4.4 V cut off, rest for 10 minutes, and discharging conditions were 0.2 C, CC, 3 V cut off, rest for 10 minutes. A charging rate characteristic (%) was obtained from charging rate characteristic=5 C charging capacity/0.2 C charging capacity.

[0.2 C Discharging Capacity]

Charging conditions were 0.2 C, CC, 4.4 V, CV, 0.05 C cut off, rest for 10 minutes, discharging conditions were 0.2 C, CC, 3 V cut off, rest for 10 minutes, and a discharging capacity (mAh/g) was 0.2 C. The results are shown in Table 1.

TABLE 1

| | Composition of positive electrode active material (mixing ratio) | | Charging rate characteristic (5 C/0.2 C) | 0.2 C discharging capacity |
|---|---|---|---|---|
| | LiVPO$_4$F | LiVP$_2$O$_7$ | (%) | (mAh/g) |
| Example 1 | 0.79 | 0.21 | 84 | 130 |
| Example 2 | 0.96 | 0.04 | 82 | 136 |
| Example 3 | 0.97 | 0.03 | 82 | 137 |
| Comparative Example 1 | 1 | 0 | 79 | 140 |

Based on the results in Table 1, in Example 1, it was found that, when the mixing ratio of LiVPO$_4$F and LiVP$_2$O$_7$ was 0.79:0.21 (x=0.21), the charging rate characteristic was 84%, the 0.2 C discharging capacity was 130 mAh/g, and compared to Comparative Example 1, a decrease in the 0.2 C discharging capacity was significantly minimized, the charging acceptability was significantly improved and the battery characteristics were excellent.

In addition, in Example 2, it was found that, when the mixing ratio of LiVPO$_4$F and LiVP$_2$O$_7$ was 0.96:0.04 (x=0.04), the charging rate characteristic was 82%, the 0.2 C discharging capacity was 136 mAh/g, and the charging acceptability was almost equal to that of Example 1, the 0.2 C discharging capacity increased and the battery characteristics were excellent.

In addition, in Example 3, it was found that, when the mixing ratio of LiVPO$_4$F and LiVP$_2$O$_7$ was 0.97:0.03 (x=0.03), the charging rate characteristic was 82%, the 0.2 C discharging capacity was 137 mAh/g, and the charging acceptability was almost equal to that of Example 1, the 0.2 C discharging capacity increased and the battery characteristics were excellent.

In addition, in Comparative Example 1, when no LiVP$_2$O$_7$ was mixed in (x=0), (0.2 C discharging capacity was 140 mAh/g, which was higher than in Examples 1 to 3, the charging rate characteristic was 79%, and the charging acceptability was inferior to any of Examples 1 to 3.

While preferred embodiments of the invention have been described and shown above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

What is claimed is:

1. A positive electrode for a lithium ion battery, comprising:
    a positive electrode current collector and a positive electrode mixture layer formed on the positive electrode current collector,
    wherein the positive electrode mixture layer contains a first positive electrode active material composed of LiVPO$_4$F and a second positive electrode active material composed of LiVP$_2$O$_7$, and
    wherein a mixing ratio of the first positive electrode active material and the second positive electrode active material contained in the positive electrode mixture layer is represented by (1−x)LiVPO$_4$F+xLiVP$_2$O$_7$, wherein x is a mass ratio, and wherein 0.03<x≤0.21.

2. A lithium ion battery comprising the positive electrode for a lithium ion battery according to claim 1.

3. A method of producing a positive electrode for a lithium ion battery, comprising forming a positive electrode mixture layer, wherein the positive electrode mixture layer comprises a first positive electrode active material and a second positive electrode active material on a positive electrode current collector, wherein a mixing ratio of the first positive electrode active material composed of $LiVPO_4F$ and the second positive electrode active material composed of $LiVP_2O_7$ is represented by $(1-x)LiVPO_4F + xLiVP_2O_7$, wherein x is a mass ratio, and wherein $0.3 < x \leq 0.21$.

4. The method of producing a positive electrode for a lithium ion battery according to claim 3,
wherein the mixing ratio is determined by Rietveld analysis of XRD patterns is represented by $(1-x)LiVPO_4F + xLiVP_2O_7$, wherein x is a mass ratio, and wherein $0.03 < x \leq 0.21$.

5. The method of producing a positive electrode for a lithium ion battery according to claim 3, comprising:
a mixing process in which LiF, PTFE, stearic acid, a vanadium compound and an ammonium phosphate compound are mixed;
a drying process in which the mixture obtained in the mixing process is dried;
a pulverizing process in which the dried product obtained in the drying process is pulverized; and
a firing process in which the pulverized product obtained in the pulverizing process is fired to obtain a positive electrode active material composed of the first positive electrode active material and the second positive electrode active material.

6. The method of producing a positive electrode for a lithium ion battery according to claim 3, comprising:

a mixing process (A) in which LiF, PTFE, stearic acid, vanadium oxide having a particle size distribution of less than 200 μm and an ammonium phosphate compound are mixed;
a drying process (B) in which the mixture obtained in the mixing process (A) is dried;
a pulverizing process (C) in which the dried product obtained in the drying process (B) is pulverized 120 times over 30 seconds;
a firing process (D) in which the pulverized product obtained in the pulverizing process (C) is fired to obtain the first positive electrode active material;
a mixing process (E) in which citric acid and phosphoric acid are mixed into a solution in which vanadium oxide is dissolved;
a drying process (F) in which the mixture obtained in the mixing process (E) is dried;
a firing process (G) in which the dried product obtained in the drying process (F) is fired;
a pulverizing process (H) in which lithium carbonate and citric acid are added to the fired product obtained in the firing process (G) and the mixture is pulverized and mixed;
a pre-firing process (I) in which the pulverized product obtained in the pulverizing process (H) is pre-fired;
a main firing process (J) in which the fired product obtained in the pre-firing process (I) is main-fired to obtain a second positive electrode active material; and
a mixing process (K) in which the first positive electrode active material and the second positive electrode active material are mixed at the mixing ratio to obtain a positive electrode active material composed of the first positive electrode active material and the second positive electrode active material.

\* \* \* \* \*